(No Model.)

W. F. DIETERICHS.
BALING HAY.

No. 247,544. Patented Sept. 27, 1881.

Attest:
H. F. Merryweather
N. D. Hanzig

W<sup>m</sup> F. Dieterichs,
Inventor.
By H. D. Perrine
Atty.

UNITED STATES PATENT OFFICE.

WILLIAM F. DIETERICHS, OF DENVER, COLORADO.

BALING HAY.

SPECIFICATION forming part of Letters Patent No. 247,544, dated September 27, 1881.

Application filed August 12, 1881. (No model.)

*To all whom it may concern:*

Be it known that I, WILLIAM F. DIETERICHS, a citizen of the United States of America, residing at Denver, in the county of Arapahoe and State of Colorado, have invented certain new and useful Improvements in Baling Hay; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
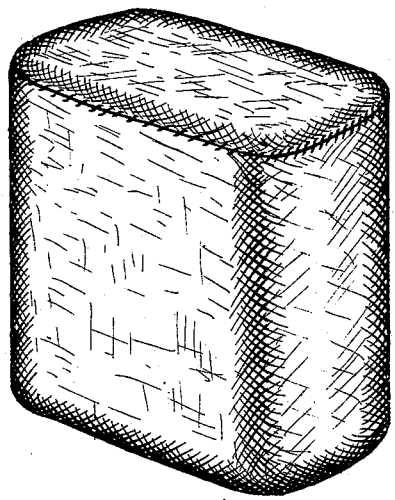
Figure 2:
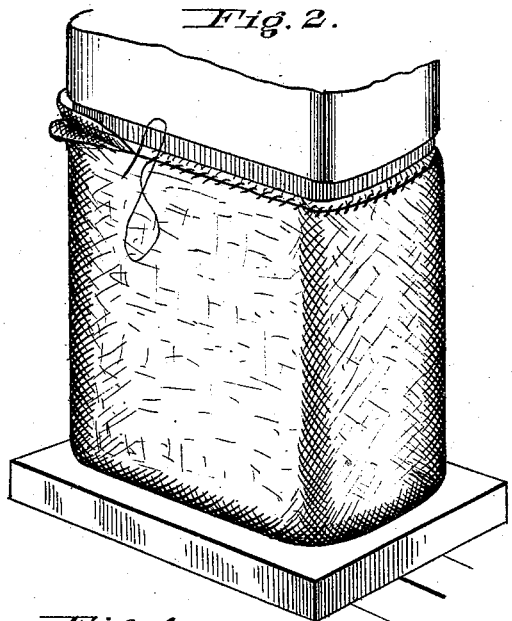
Figure 3:
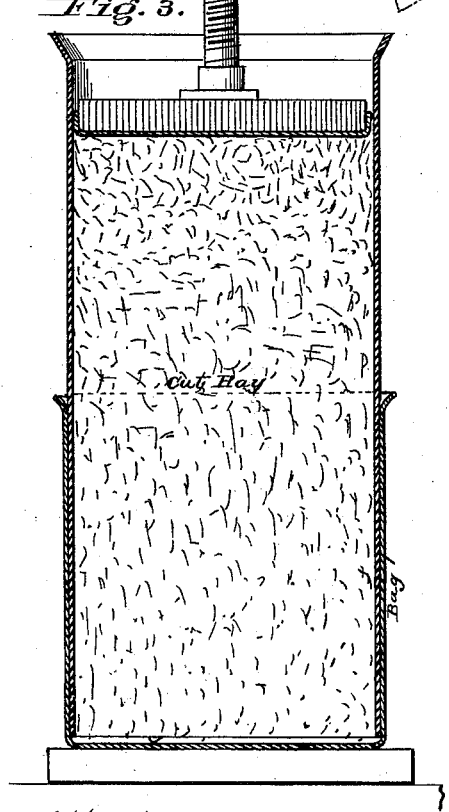
Figure 4:
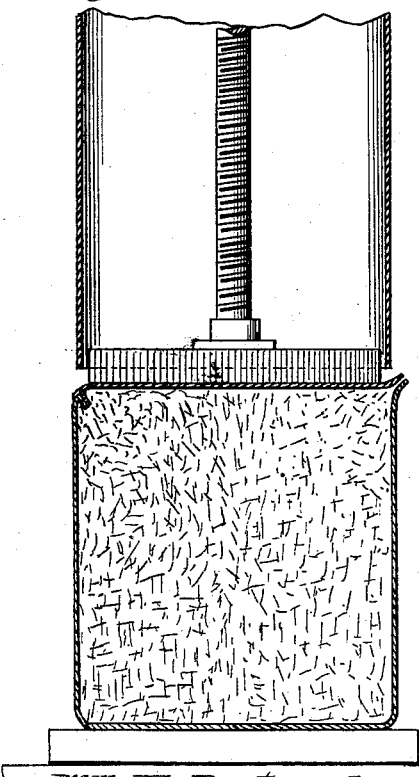

Figure 1 is a perspective of the bale of hay or straw; Fig. 2, a perspective of the same as it appears at the stage when the sewing is done; Fig. 3, a vertical section through the baling-bag, filling-tube, and follower, representing the parts as they appear at the beginning of the compressing process; and Fig. 4 is a like section, representing the parts as they appear after the completion of the compressing process, the filling-tube being raised from about the baling-bag.

My invention has reference to baling short-cut hay or straw; and it consists in the bale of hay or straw formed as hereinafter particularly described, and as defined by the claims.

The object of the invention is to bale cut hay or straw, so that a hundred pounds or more may be confined within small bounds and be protected from dirt by an envelope or protecting-covering.

In the accompanying drawings I illustrate the method of baling and the bale as it appears ready for the trade.

In carrying out my invention I make use of a bag or sack, A, of any suitable textile fabric, a tube, B, for holding open the bag and directing the cut hay therein, and for receiving the lateral strain during the process of compression, and a follower, C, of a screw or other press.

The hay E is first cut into short lengths of one-half to three-fourths (more or less) of an inch, and then passed over or through an air-blast, so as to be cleared from dust and dirt. It is then passed through a hopper spout or otherwise into the upper open end or mouth of tube B, around which tube, extending upward from its lower open end, is placed the sack A. The cut hay is run into this tube until the tube contains one hundred, one hundred and twenty-five, or one hundred and fifty pounds, or other definite quantity, and then there is laid across the top of the hay a strip or piece, D, of the same material as the sack, and in dimensions large enough to cover the entire top of the hay in the sack and to be sewed to the top edge of the sack. The follower C of the screw or other press is next brought down upon the strip D on the top of the hay, and power applied so as to compress the hay into a compact mass within the sack, as illustrated in Figs. 3 and 4 of the drawings. Then the tube B is raised by suitable means, which may be automatic in their operation, until it is above the top edge of the sack, the pressure of the follower being still upon the hay confined within the sack, as shown in Fig. 4 of the drawings. The edges of the sack and strip D are then turned in and sewed or otherwise secured together, as illustrated in Fig. 2, the edges of the fabric being inside the sack or envelope, so that there will be no protruding edges to unravel, and so as to afford an extra thickness of the material for the stitches, whereby results greater strength in the seam.

When the bale is completed it appears as illustrated in Fig. 1, and is sold as a staple article of manufacture.

The hay is protected from dust and dirt, and when a portion of it is used the remainder is still protected by the envelope. It can be readily transported from place to place and closely packed in the store-house, and the hay is cut ready to be combined with other feed for the animal.

The press and attachments will form the subject-matter of another application.

Having described my invention, what I claim is—

1. The within-described baled hay, composed of fine-cut and compressed hay E, sack or envelope A, and strip C, the edges of the strip and envelope being turned in and the two then secured together, substantially as set forth.

2. The method of baling fine-cut hay, consisting in compressing the hay in a sack or envelope, with a separate strip to compose a part of the envelope between the compressing means and the hay, and then, while the pressure is still on, securing the said strip and envelope together, substantially as set forth.

In testimony whereof I affix my signature in presence of two witnesses.

WILLIAM F. DIETERICHS.

Witnesses:
JAMES H. BLOOD,
JAMES H. BROWN.